Patented Aug. 8, 1933

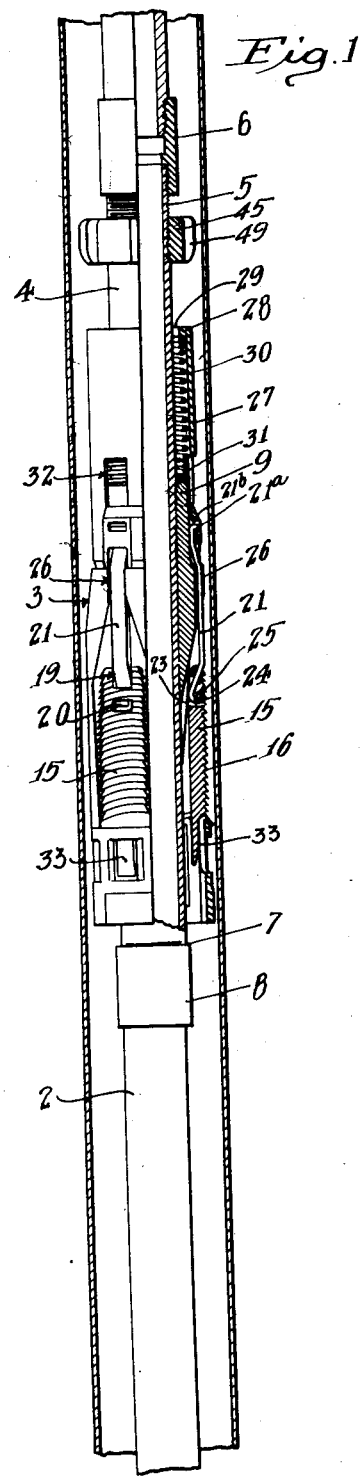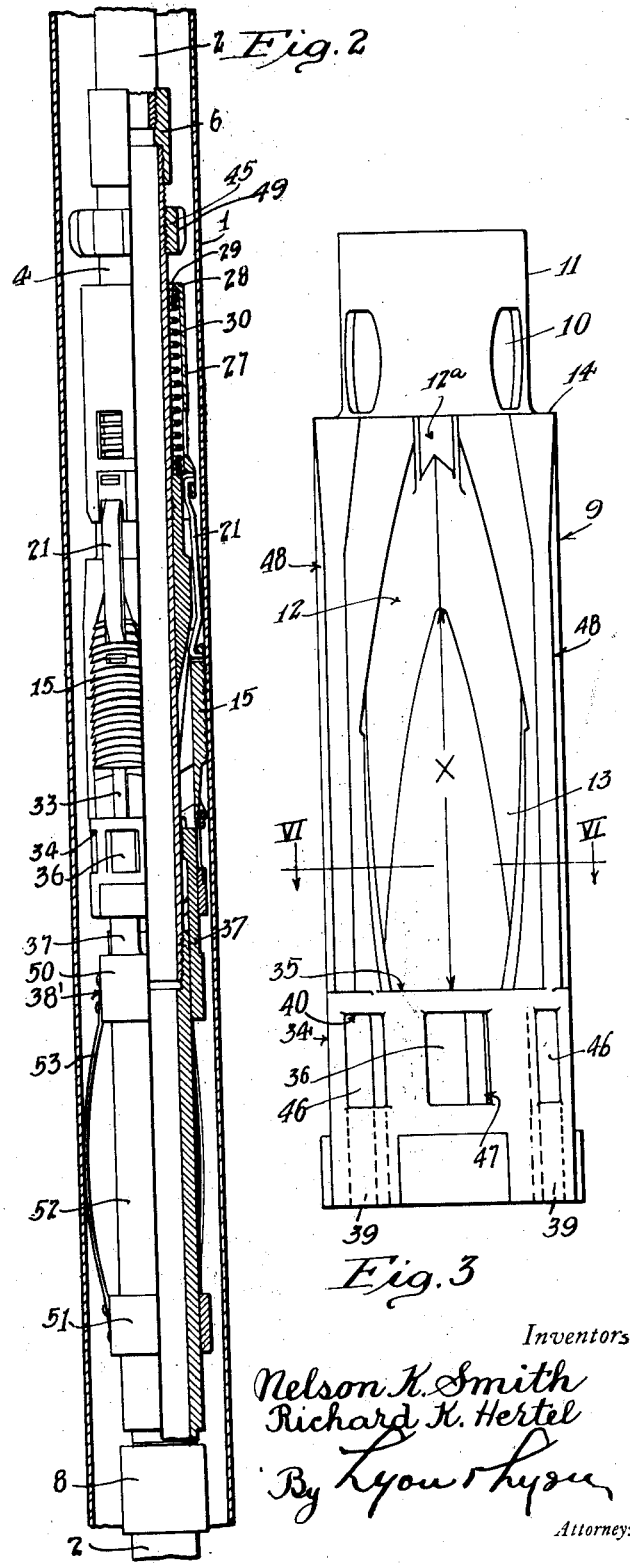
Aug. 8, 1933.  N. K. SMITH ET AL  1,921,547
TUBING CATCHER
Filed April 21, 1931  2 Sheets-Sheet 1
Fig.1  Fig.2  Fig.3
Inventors
Nelson K. Smith
Richard K. Hertel
By Lyon & Lyon
Attorneys

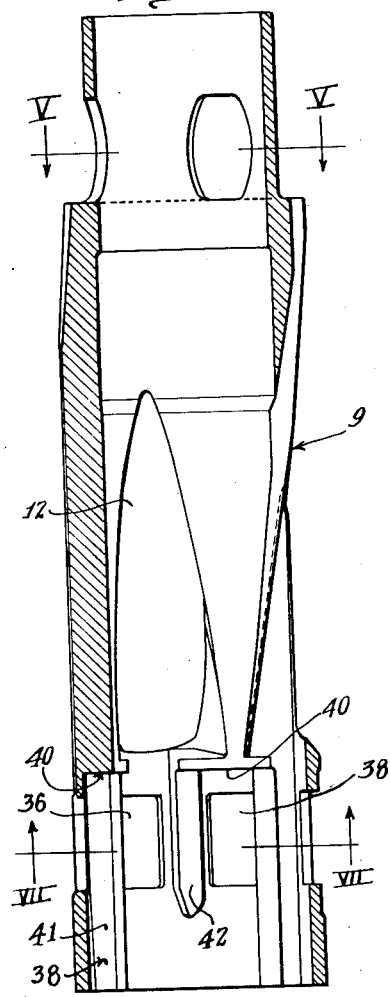
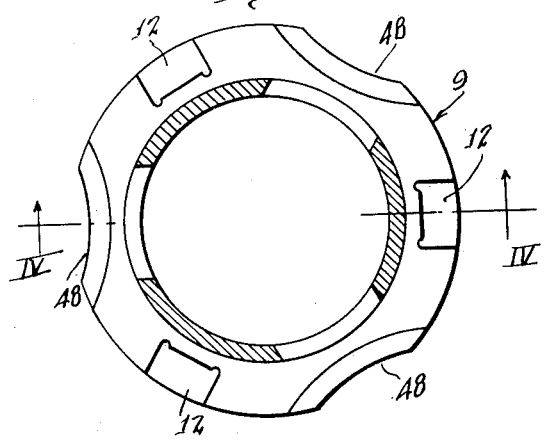
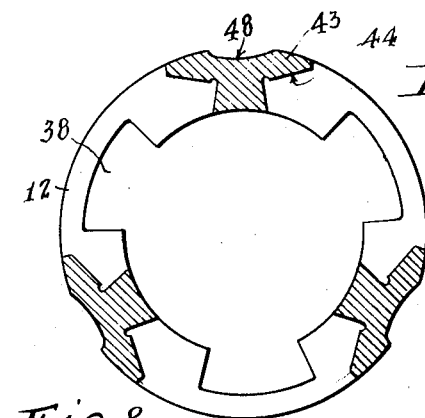
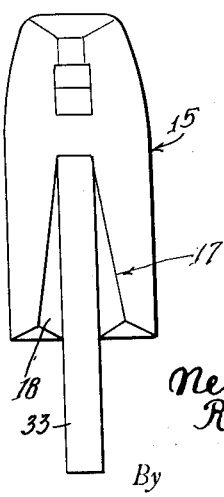
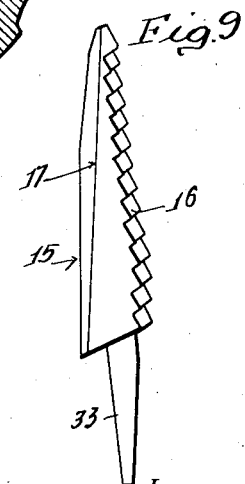

1,921,547

UNITED STATES PATENT OFFICE 1,921,547

TUBING CATCHER

Nelson K. Smith and Richard K. Hertel, Los Angeles, Calif., assignors to Byron Jackson Co., Los Angeles, Calif., a Corporation of Delaware Application April 21, 1931. Serial No. 531,718

4 Claims. (Cl. 103—219)

Our invention relates to tubing catchers and has particular reference to a device for automatically arresting the fall of oil well tubing by expanding the device to cause the same to grip the wall of the casing through which the tubing passes with a wedging action.

In oil well operations, it is common practice to insert within the oil well casing an extended string of pipe or tubing of smaller diameter than the casing which tubing, by reason of its great length relative to its diameter, is under such strain that it frequently breaks and falls in the casing. Numerous devices have been employed for automatically wedging the tubing against the walls of the casing in the event that it breaks or is dropped, thereby preventing injury to the tubing in such event. Such devices consist, primarily, in interposing at one or more points along the line of tubing wedge-shaped slips which operate upon wedge-shaped bearing surfaces which are in turn secured to the exterior of the tubing.

Where the difference in size of the tubing and casing is relatively great, such wedge-shaped slips and bearing surfaces may be made sufficiently large to effectively stop the fall of the tubing. However, where the size of the tubing is such as to substantially fill the casing, the amount of space between the tubing and the casing is so small that both the slips and their bearing surfaces must be relatively short because of the small amount of lateral distance permitted for the movement of the slips and bearing surfaces. This means that the weight of the tubing will be carried upon a relatively small area of the casing and it frequently occurs that the casing is broken or split by the pressure which is exerted from such small areas.

It is an object of this invention to provide a tubing catcher of the character described above in which the relative length of the slips may be greatly increased to thereby increase the area of the casing which is gripped by the slips.

Another object of the invention is to provide a catcher head or bearing member upon which the slips operate with a wedge-shaped surface thereon which intersects and overlaps the outer surface of the tubing with which it is associated to thereby increase the effective length permitted the slips.

Another object of the invention is to provide a tubing catcher as defined in the preceding paragraph, in which the slips are formed with an internal recess permitting overlapping of the inner contour of the slips with the outer contour of the tubing with which it is associated to thereby effectively increase the length permitting the slip.

Another object of the invention is to provide a tubing catcher in which the slips are maintained in position by longitudinal extensions on each side of the slips adapted to make the slips dovetail fit with similar dovetailed slots formed in the head of the catcher instead of recesses formed on the rear of the slips for this purpose.

Another object of the invention is to provide a tubing catcher having slips arranged to be set into engagement with the walls of a casing through which the catcher passes which is adapted to be employed with an anchor to be rendered either operative or inoperative as desired and in which means is provided for automatically setting the slips upon undue acceleration of the tubing catcher independent of the condition of the anchor.

Another object of our invention is to provide a tubing catcher which will permit of more rapid lowering of the tubing into the casing without setting the slips into gripping action than has been possible with prior catchers, but which upon falling of the tubing will automatically settle the slips into gripping relation.

Other objects of the invention will be apparent from a study of the following specifications read in connection with the accompanying drawings wherein Figure 1 is an elevational view shown partly in section of a tubing catcher constructed in accordance with my invention;

Figure 2 is an elevational view, similar to Fig. 1, illustrating the tubing catcher constructed in accordance with my invention, employed in connection with an anchor;

Figure 3 is a detail front elevational view of the tubing catcher head employed in practicing my invention;

Figure 4 is a longitudinal sectional view of the tubing catcher head taken along line IV—IV of Fig. 5;

Figure 5 is a detail horizontal sectional view taken along line V—V of Fig. 4;

Figure 6 is a detail horizontal sectional view taken along line VI—VI, of Fig. 3; and Figure 7 is a detail horizontal sectional view taken along line VII—VII of Fig. 4.

Figure 8 is a detail, rear, elevational view of one of the slips employed in connection with our invention; and Figure 9 is a side, elevational view of the slips shown in Fig. 8.

Referring to the drawings, we have illustrated in Figs. 1 and 2, a well casing 1 which, as will be understood, comprises a plurality of connected sections of relatively large pipe extending through the bore of the well with which it is associated.

Passing downwardly through the interior of the casing 1, we have illustrated a string of oil well tubing 2, such tubing, like the casing, comprising a plurality of connected sections of pipe of smaller diameter than that of the casing. Interposed between two adjacent sections of the tubing 2, we have illustrated our tubing catcher 3, as comprising a short section of tubing 4, generally referred to as a nipple, the upper end 5 of which is provided with threads to engage a coupling 6 to attach the same to the lower end of the upper portion of the tubing string while the lower end 7 is similarly provided with threads engaging a coupling 8 attaching the same to the lower section of tubing 2. The nipple 4, preferably, has an internal diameter equal to the internal diameter of the tubing 2 so as to provide the same flow area through the tubing catcher as is provided through the tubing string.

Rigidly attached to the nipple 4, we have illustrated a tubing catcher head 9, illustrated in detail in Figs. 3 and 4, as comprising a sleeve having an internal diameter equal to the external diameter of the nipple 4 and arranged to telescopically engage the nipple 4 and be rigidly attached thereto in any suitable manner, as by welding the head 9 to the nipple through suitable openings 10 provided in a tubular extension 11 formed upon the upper end of the head 9.

The main body of the head 9 is illustrated as being provided with a plurality of tapered grooves 12, three of such grooves being illustrated, and each of the grooves having its surface tapering both inwardly and downwardly, the angle of taper being such that the length of that portion of the groove indicated by the arrow $x$ on Figure 3, intersects the outer surface of the nipple 4 so that the lower ends 13 of the groove extend around the outer surface of the nipple.

It will be understood by those skilled in the art that the taper which is permitted the head 9 and its associated slips must not be too small since when the tubing catcher sets it must be possible to readily withdraw the tubing by an upward pull on the tubing which would be impossible if the angle of taper is so small that the wedge action will require great pressure to release the tubing catcher. On the other hand, the taper must not be too great since a great taper will prevent effective wedging of the slips against the casing.

It is generally assumed that the best angle of such taper lies between 7° and 10°.

By referring to Figure 3, it will be observed that an angle between 7° and 10° extending from the shoulder 14 from the upper end of the body of the head 9 to the upper end of the arrow $x$, will constitute the hypothenuse of a triangle, the base of which is the thickness of the wall of the head 9 and the length of which is the distance between the shoulder 14 and the upper end of the arrow $x$. Thus the length of the wedge which will be permitted between the head 9 and the walls of the casing would ordinarily be limited to this short distance. However, by extending the taper of the recess on the same 7° to 10° angle around the outer surface of the nipple 4, the effective length of the wedging action may be materially increased, in the example shown the effective length being substantially tripled.

Referring again to Fig. 1, it will be observed that we have provided a plurality of slips 15, one for each of the recesses 12 formed in the head 9. These slips 15 are illustrated as comprising wedge-shaped members of relatively hard material, having an arcuate outer face formed with teeth or wickers 16 cut horizontally or at a slight angle to the horizontal. We prefer to cut them at an angle so that when the wickers engage the casing 1 they will dig into the casing with a slight spiral motion.

It will be observed that the inner face 17 of each of the slips 15 tapers outwardly and downwardly along substantially the same angle as is formed upon the outer surface of the recesses 12 in the head 9 so that the slips 15 are relatively thin at their outer ends and relatively thick at the lower end.

It will also be observed that a concave recess 18 is formed within the rear surface of the slips 15 which permits the outer edges of the slip to extend around the nipple 4 so that when the slips are in their lowermost position relative to the recesses 12, the slip partially surrounds the outer surface of the nipple. By reason of this construction, a relatively great length is permitted the slip 15 without reducing the taper of its edges below the 7° to 10° limit which has been found most desirable for the wedging action of the slips.

It follows, therefore, that the greater length which is permitted the slip, the greater effective gripping area is provided thereon so that a greater area of the casing is engaged for the purpose of supporting the tubing below the catcher.

Referring particularly to Fig. 1, it will be observed that the upper end of each of the slips 15 is provided with a pair of openings 19 and 20 for the purpose of receiving therein a rein 21 by which the slips may be drawn upwardly relative to the head 9 when the slips are to be set against the casing 1.

The upper opening 19 communicates with a groove 23 upon the rear of the slip 15 so that the reins 21 extend over the front of the slip and thence extend to the rear of the slip and is bent outwardly, as is indicated at 24, to engage the strap or bar 25 formed by the material left between the openings 19 and 20. In this manner the rein 21 is effectively engaged with the slip 15 but may readily be detached therefrom by swinging the upper end of the rein outwardly and thus engaging the end 24 thereof with the bar or strap 25.

It will also be observed that the upper end of the rein 21 extends through a vertical opening 26 formed upon the lower end of an actuator 27, the extreme end 21a of the rein 21 being bent outwardly to pass through an opening 21b which extends radially through the wall of the actuator 27 to provide a readily detachable connection between the rein and the actuator.

It will be observed that a vertically extending groove 12a is formed in the head 9 communicating with the recess 12 and that the rein 21 which constitutes a rectangular cross section strap seats in the groove 12a thus preventing relative rotational movement of the head with respect to the slips 15 or the actuator 27.

The actuator 27 is illustrated as comprising a sleeve, the upper end of which is formed with a radial flange 28 extending inwardly but providing an opening 29 of considerably greater diameter than the outer diameter of the nipple 4.

An actuator spring 30 surrounds the nipple 4 and engages at its opposite ends the upper end 31 of the head 9 and the lower side of the flange 28, respectively, so as to normally tend to push the actuator upwardly relative to the head 9. The strength of the spring 30 is selected, such that the spring will be under compression when supporting the weight of the actuator reins and slips for a purpose to be hereinafter described.

It will be further observed that the actuator 27 is provided with a plurality of openings 32 permitting fluid which may be in the casing to pass to the interior of the sleeve 27 so that a fluid passage is permitted between the space 29 and the openings 32 through which fluid may readily flow.

It will also be observed that the lower end of the slips 15 are provided with longitudinally extending tongues 33 which extend downwardly a considerable distance below the toothed surface of the slip.

It will also be observed that the head 9 is provided with a downwardly extending skirt 34 constituting a continuation of the cylindrical contour of the head 9, the portions of the head 9 cut away to form the grooves or recesses 12 leaving an upper surface 35 on the skirt 34 provided with a plurality of openings 36 extending longitudinally therethrough to receive the tongues 33. The openings 36 extend entirely through the skirt 34 to permit insertion therein of upstanding fingers 37 on the anchor 38' if the anchor is to be employed.

It will also be observed that the skirt 34 is provided with an additional set of longitudinally extending openings 39 which, however, do not extend entirely through the skirt 34 but terminate slightly below the upper surface 35, as is indicated by the reference character 40.

By referring particularly to Fig. 4, it will be observed that the openings 36 and 38 constitute pockets alternately arranged so that each of the pockets 36 extends into communication with the recesses 12 and alternates with the pockets 38 which terminate as indicated at 40 below the recesses.

It will also be observed that the metal left between the pockets 36 and 38 constitute a plurality of ribs, three of which are indicated by the reference character 41, which extend to the bottom of the head 9, while the remaining three, indicated by the reference character 42, extend only a portion of the distance to the bottom of the head and constitute a dividing member separating the pockets 36 and 38.

The lower ends of the ribs 42 are preferably tapered, as is indicated in Fig. 4, for the purpose of guiding the fingers 37 on the anchor 38' into one or the other of the pockets depending upon the desired position to which the fingers 37 are to be moved.

The operation of our device is as follows: The tubing catcher 3 may be readily assembled by securing the head 9 upon the nipple 4 by welding, as hereinbefore stated. The actuator 27 may then be placed in position upon the nipple 4 with the spring 30 interposed between the head 9 and the flange 28 on the actuator. The reins 21 may then be engaged in the actuator and the slips 15 attached to the lower ends of the reins 21. The slips 15 may then be inserted in their grooves or recesses 12, as inserting the tongues 33 through the openings 36 in the skirt 34 of the head 9 and drawing the sleeves downwardly into their lowermost position, as illustrated in Fig. 1.

By referring, particularly, to Figs. 3 and 6, it will be observed that the recesses 12 are narrower at their lower ends to provide annularly extending guides 43 engaging the outer surface of the slips 15 when the slips are in their lowermost position. The inner surface of the guides 43 are cut away, as indicated at 44, to form annular faces constituting substantially a dovetail fit with the sides of the slips 15 to thus hold the slips in their retracted position against the nipple 4. A guide nut 45 may then be threaded upon the upper end 5 of the nipple and screwed downwardly to such position as will prevent the actuator 27 moving upwardly far enough to allow the slips to become disengaged from the dovetail surfaces 44.

Thus the entire assembly of the tubing catcher is held in place by means of the guide nut 45 which upon being removed permits the movement of the actuator a sufficient distance to allow the slips 15 to be disengaged from the head and the entire device may be assembled and dissembled without manipulation of screws or bolts or other securing means.

The tubing catcher may then be secured to the coupling 8 upon the upper end of the lower section of tubing 2 and the upper end of the nipple 4 may then be attached to the upper section of the tubing. If the tubing catcher is to be employed without the anchor, the assembled tubing and tubing catcher may be lowered into the casing to the desired position at a relatively great speed without danger of premature setting of the slips.

To insure of this rapid movement of the tubing catcher without setting the slips, it will be observed that portions of the skirt 34, constituting the outer wall of the pockets 38 are cut away, as is indicated at 46, to provide passages for liquid which may be in the casing, thus permitting this liquid to readily pass the lower end of the tubing catcher. Also, it will be observed that the pockets 36 communicate with the exterior of the tubing catcher, as by means of openings 47 so that liquid pressure which may be exerted upwardly in the pockets 36 is relieved to the outside of the tubing catcher and thus the force of such liquid is not directed entirely against the lower edge of the slips 15 or their tongues 33.

Moreover, it will be observed from an inspection of Figs. 3 and 5, that a plurality of grooves 48 are provided extending longitudinally of the head 9 to constitute fluid passages arranged in alternation with the recesses 12. These grooves permit fluid to pass readily past the head 9, as the same is being lowered into the casing.

It will also be observed that the guide nut 45 has a diameter substantially filling the casing 1 which will retard the upward flow of fluid past the tubing catcher to thus cause a downward pressure to be exerted upon the upper end of the actuator 27 so that while the tubing catcher is being inserted in the casing the tendency of the liquid in the casing to set the slips is counterbalanced by such downward force created by the guide nut 45.

It will also be observed that by providing the grooves 48 in the head 9, the effective cross sectional area of the head is reduced so that the velocity of the liquid flowing past the head will be reduced below that around the skirt 34 so that lowered velocity of fluid flow tends to prevent the fluid from lifting the slips 15 and setting them.

It will also be observed that the guide collar 45 is provided with a plurality of slots 49 extending through its periphery to permit fluid to pass this nut or collar. However, such slots will not materially detract from the effect of the lower face of this nut in creating a downward motion of the liquid at this point.

Assuming that during the lowering operation the string of tubing 2 should break, or the mechanism by which the tubing is lowered should break, so that the tubing starts to fall freely down the casing, the tubing and the head 9 of the catcher will fall at substantially gravity acceleration, while the actuator 27, due to the upward force exerted thereon by the spring 30, would move upwardly relative to the head 9, drawing the reins 21 upwardly and drawing the slips 15 upwardly along the tapered surface of the recesses 12. The upward movement of the slips along the tapered surfaces of the recesses 12 would force the slips 15 outwardly into engagement with the walls of the casing 1, as is illustrated in Fig. 2. The wickers or teeth on the slip 15 will engage the interior wall of the casing and hold the same against further downward movement, while the tubing and the head will continue downwardly until the wedging action between the tapered surface of the slips and the head force the slips 15 outwardly into gripping relation with the casing 1.

The fact that the angle of the taper on both the slips and the head is relatively small, makes it possible to release the tubing catcher by an upward movement of the tubing without exerting an undue upward force on the tubing.

In practice, several of these tubing catchers may be placed at various positions along the line of the tubing so that should the tubing part at any point the lower section would be immediately caught as it falls.

When our tubing catcher is to be employed in connection with an anchor, illustrated particularly in Fig. 2, the anchor extension nipple 52 is secured to the lower end of the nipple 4 of the tubing catcher and the lower section of tubing 2 is coupled to the lower end of the anchor extension nipple as by means of the coupling 8.

The particular type of anchor which may be employed in connection with our tubing catcher is specifically illustrated in Fig. 2, as comprising a pair of sleeves 50 and 51, slidably mounted upon a nipple 52 which nipple is threaded at each of its ends for engagement with the tubing catcher and the string of tubing 2. The sleeves 50 and 51 are spaced from each other by means of a plurality of bowed springs 53 which normally exert spring pressure against the inner walls of the casing 1 so as to constitute a drag thereon as the tubing is lowered into the casing.

As hereinbefore explained, the upper sleeve 50 may be provided with a plurality of upstanding fingers 37, and in the construction illustrated herein there will be three of these fingers, each constituting an upstanding bar of such dimensions as to be readily inserted in either the pockets 38 or the pockets 39 formed in the lower part of the skirt 34 on the head 9 of the tubing catcher.

In order to lower the tubing 2 into the casing with considerable speed, the anchor fingers 37 must be inserted in pockets 38 so that the upper ends of the fingers 37 will bear upon the surfaces 40 of the head 9 and will have no effect toward setting the slips 15 into gripping action. However, when the tubing has been lowered into a desired position in the casing and it is desired to lock the tubing in this position, a slight upward motion of the tubing will cause the anchor fingers 37 to be withdrawn from the pockets 38 so that the tubing may be rotated through a part of a revolution and again lowered to cause the fingers 37 to extend upwardly in the pockets 36. In this position the upstanding fingers 37 will engage the tongues 33 of the slips 15 and will hold the slips against downward movement, while the tubing 2 and head 9 are lowered. The upward movement of the slips 15 will cause them to be moved outwardly as though they had been operated by the actuator 27 and they will thus engage the casing and wedge the tubing in secure relation relative to the casing.

While we have illustrated and described the preferred embodiment of our invention, we do not desire to be limited to any of the details shown or described herein, except as defined in the appended claims.

We claim:

1. In a tubing catcher, a nipple, a head surrounding the nipple, a recess formed in said head tapering downwardly and inwardly of said head to intersect said nipple and extend beyond said point of intersection, a slip receivable in said recess and having a portion of its rear surface cut away to permit said slip to partially surround said nipple when in lower position in said recess, the sides of said recess in the lower end thereof having inwardly directed surfaces engaging the outer surface of said slip to retain the said slip in said recess.

2. In a tubing catcher comprising a nipple, a tubular head surrounding said nipple and rigidly connected thereto, a recess extending longitudinally of said head, a slip in said recess, a tongue formed on the lower end of said slip, a longitudinally extending opening in the base of said head communicating with said recess to form an anchor receiving pocket and to receive therein the depending tongue of said slip, an anchor secured to said nipple below said head and having an upstanding finger for said pocket receivable in said pocket when said head is moved toward said anchor to engage said depending tongue and move said slip, an additional pocket formed in the base of said head and staggered with respect to said first named pocket for receiving therein said upstanding finger of said anchor when said head is rotated relative to said anchor.

3. In a tubing catcher, a nipple, a head surrounding the nipple and provided with a slip holding recess, a slip in said recess, said slip having a slot in its upper end to receive a rein, an actuator surrounding said nipple above said head, said actuator being provided with a rein-receiving slot, spring means biasing said actuator for upward movement relative to said head, a strap connector for said slip having hook-like projections on each end thereof, adapted to engage the slots in said slip and actuator, each of said connections permitting relative motion between said strap and said slip or actuator in a radial direction with respect to the axis of the nipple and head.

4. In a tubing catcher, a nipple, a head on said nipple, an angular bearing surface formed upon said head and extending inwardly and downwardly to intersect said nipple and extending around the said nipple below said intersection and a slip having an angular rear face conforming with the angle of said bearing surface and having a recess formed in said rear surface to permit said slip to partially surround said nipple below said point of said intersection.

NELSON K. SMITH.
RICHARD K. HERTEL.